US012151697B2

United States Patent
Koga (10) Patent No.: US 12,151,697 B2
(45) Date of Patent: Nov. 26, 2024

(54) CONTROL DEVICE, STRADDLE TYPE VEHICLE, OPERATION METHOD OF CONTROL DEVICE, AND STORAGE MEDIUM

(71) Applicant: HONDA MOTOR CO., LTD., Tokyo (JP)

(72) Inventor: Futoshi Koga, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 284 days.

(21) Appl. No.: 17/903,930

(22) Filed: Sep. 6, 2022

(65) Prior Publication Data

US 2022/0410917 A1 Dec. 29, 2022

Related U.S. Application Data

(63) Continuation of application No. PCT/JP2020/014898, filed on Mar. 31, 2020.

(51) Int. Cl.
*B60W 50/12* (2012.01)
*B60W 10/04* (2006.01)
(Continued)

(52) U.S. Cl.
CPC ............ *B60W 50/12* (2013.01); *B60W 10/04* (2013.01); *B60W 10/11* (2013.01); *B60W 50/14* (2013.01);
(Continued)

(58) Field of Classification Search
CPC ...... B60W 10/04; B60W 10/11; B60W 50/14; B60W 2555/20; B60W 10/30; B60W 2300/36; B62J 17/04; B62J 33/00
See application file for complete search history.

(56) References Cited

U.S. PATENT DOCUMENTS 7,966,127 B2 * 6/2011 Ono ...................... B60W 10/20
701/96
D716,702 S 11/2014 Song et al.
(Continued)

FOREIGN PATENT DOCUMENTS

CN 105723081 A 6/2016
CN 206297670 U 7/2017
(Continued)

OTHER PUBLICATIONS

Asad J. Khattak, The impact of adverse weather conditions on the propensity to change travel decisions (1997).*
(Continued)

*Primary Examiner* — Gertrude Arthur Jeanglaude
(74) *Attorney, Agent, or Firm* — Thomas | Horstemeyer, LLP (57) ABSTRACT

A control device that controls a straddle type vehicle, the control device comprising: a route information acquisition unit configured to acquire information of a scheduled travel route of the straddle type vehicle; a weather information acquisition unit configured to acquire weather information corresponding to the scheduled travel route; a determination unit configured to determine whether the scheduled travel route of the straddle type vehicle is to be affected by weather based on the weather information; and a control unit configured to control a function related to a traveling state of the straddle type vehicle, based on a determination result of the determination unit.

18 Claims, 5 Drawing Sheets

(51) Int. Cl.
*B60W 10/11* (2012.01)
*B60W 50/14* (2020.01)
*B62J 17/04* (2006.01)
*B62J 33/00* (2006.01)
*B62J 45/20* (2020.01)
*B62J 50/22* (2020.01)
*B60W 10/30* (2006.01)

(52) U.S. Cl.
CPC ............... *B62J 17/04* (2013.01); *B62J 33/00* (2013.01); *B62J 45/20* (2020.02); *B62J 50/22* (2020.02); *B60W 10/30* (2013.01); *B60W 2050/146* (2013.01); *B60W 2300/36* (2013.01); *B60W 2555/20* (2020.02)

(56) References Cited

U.S. PATENT DOCUMENTS

| | | | |
|---|---|---|---|
| D722,538 S | 2/2015 | Song et al. | |
| 9,216,789 B2 | 12/2015 | Hamlin et al. | |
| 9,381,803 B2 | 7/2016 | Galsworthy et al. | |
| 9,394,859 B2 | 7/2016 | Parnofiello et al. | |
| 9,421,860 B2 | 8/2016 | Schuhmacher et al. | |
| 9,550,541 B2 | 1/2017 | Lenton et al. | |
| 9,908,577 B2 | 3/2018 | Novak et al. | |
| 9,958,111 B2 | 5/2018 | Oltmans | |
| 10,054,455 B2 * | 8/2018 | Asakura | G01C 21/3461 |
| 10,183,717 B2 | 1/2019 | Holt et al. | |
| 10,189,524 B2 | 1/2019 | Schafer et al. | |
| 10,549,804 B2 | 2/2020 | Zellmer et al. | |
| 10,760,730 B2 | 9/2020 | Lenton et al. | |
| 11,427,277 B2 | 8/2022 | O'Rourke et al. | |
| 2014/0131128 A1 | 5/2014 | Schuhmacher et al. | |
| 2014/0131129 A1 | 5/2014 | Galsworthy et al. | |
| 2014/0136076 A1 | 5/2014 | Novak et al. | |
| 2015/0129342 A1 | 5/2015 | O'Rourke et al. | |
| 2015/0130209 A1 | 5/2015 | Hamlin et al. | |
| 2015/0353156 A1 | 12/2015 | Hamlin et al. | |
| 2016/0280324 A1 | 9/2016 | Schafer et al. | |
| 2016/0298807 A1 | 10/2016 | Oltmans | |
| 2016/0318569 A1 | 11/2016 | Zellmer et al. | |
| 2017/0101149 A1 | 4/2017 | Lenton et al. | |
| 2018/0162474 A1 | 6/2018 | Novak et al. | |
| 2018/0216780 A1 | 8/2018 | Oltmans | |
| 2019/0276036 A1 * | 9/2019 | Noguchi | B60W 30/18 |
| 2019/0389526 A1 | 12/2019 | Leuchte | |
| 2020/0355318 A1 | 11/2020 | Parnofiello et al. | |

FOREIGN PATENT DOCUMENTS

| | | |
|---|---|---|
| CN | 109326134 A | 2/2019 |
| CN | 110366521 A | 10/2019 |
| EP | 1975050 A1 | 10/2008 |
| EP | 1975050 B1 | 4/2012 |
| JP | H06-289038 A | 10/1994 |
| JP | H11-051682 A | 2/1999 |
| JP | 2006-329693 A | 12/2006 |
| JP | 2008-238872 A | 10/2008 |
| JP | 2012-216103 A | 11/2012 |
| JP | 2015-058898 A | 3/2015 |
| JP | 2020-023218 A | 2/2020 |
| WO | 2015/040831 A1 | 3/2015 |
| WO | 2021/199321 A1 | 10/2021 |

OTHER PUBLICATIONS

Asad J Khattak et al. "The impact of adverse weather conditions on the propensity to change travel decisions" 1997, Pergamon See abstract (Year: 1997).*
International Search and Written Opinion for PCT/JP2020/014898 mailed Jun. 23, 2020. (partially translated).
Chinese Office Action for Chinese Patent Application No. 202080098302.0 mailed Apr. 28, 2023.

* cited by examiner

CONTROL DEVICE, STRADDLE TYPE VEHICLE, OPERATION METHOD OF CONTROL DEVICE, AND STORAGE MEDIUM

CROSS-REFERENCE TO RELATED APPLICATION(S)

This application is a continuation of International Patent Application No. PCT/JP2020/014898 filed on Mar. 31, 2020, the entire disclosures of which are incorporated herein by reference.

BACKGROUND OF THE INVENTION

Field of the Invention

The present invention relates to a control device, a straddle type vehicle, an operation method of the control device, and a storage medium.

Description of the Related Art

Patent Literature 1 discloses provision of precipitation information on a scheduled travel route of a vehicle. By utilizing the precipitation information, it becomes possible to continue traveling while avoiding a route where precipitation is predicted. On the other hand, even on a route where the precipitation is predicted, the continuation of traveling is desired in some cases, because of various situations such as an avoiding route being a detour.

CITATION LIST

Patent Literature

PTL1: Japanese Patent Laid-Open No. 2012-216103

In the conventional technique, however, there is a drawback that no measure is taken to continue traveling, when affected by weather such as bad weather.

The present invention has been made in view of the above drawback, and has an object to provide a technique for achieving safer traveling, when affected by weather.

SUMMARY OF THE INVENTION

According to one aspect of the present invention, there is provided a control device that controls a straddle type vehicle, the control device comprising: a route information acquisition unit configured to acquire information of a scheduled travel route of the straddle type vehicle; a weather information acquisition unit configured to acquire weather information corresponding to the scheduled travel route; a determination unit configured to determine whether the scheduled travel route of the straddle type vehicle is to be affected by weather based on the weather information; and a control unit configured to control a function related to a traveling state of the straddle type vehicle, based on a determination result of the determination unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In addition, in the present specification, expressions such as front, rear, up, and side (left/right) will be used in some cases. However, these terms are used as expressions indicating relative directions with a vehicle as a reference. For example, "front" indicates a front side in a front-and-rear direction of the vehicle, and "upper" indicates a height direction of the vehicle.

First Embodiment

Figure 1:
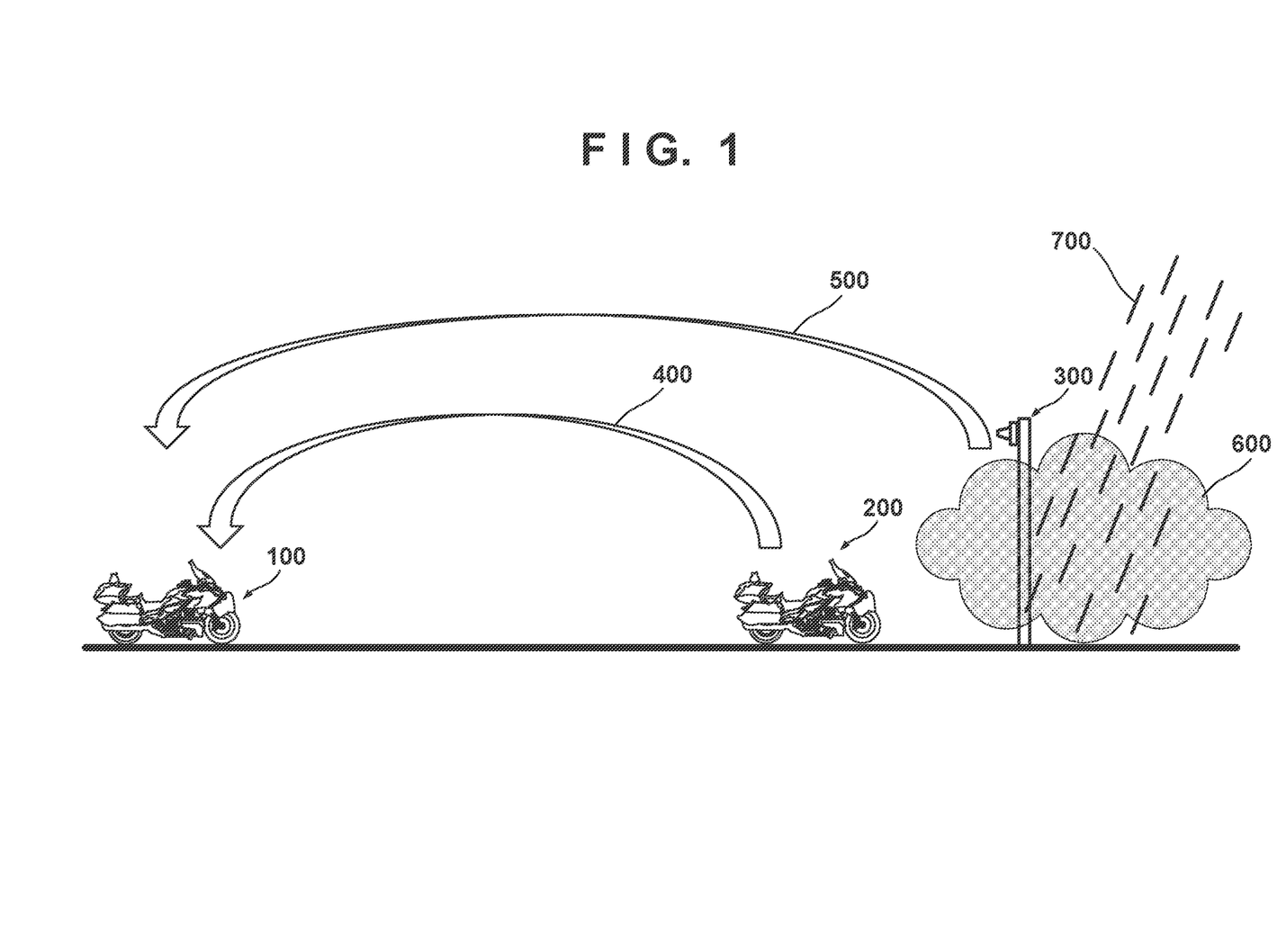
FIG. 1 is an external view including a straddle type vehicle (motorcycle) according to an embodiment of the present invention.

FIG. 1 is a diagram including a motorcycle that is an example of a straddle type vehicle to which the present invention is applicable. The motorcycle 100 is capable of communicating with a preceding vehicle (such as a motorcycle 200) through inter-vehicle communication 400 to transmit and receive information. In addition, the motorcycle 100 is capable of communicating with an on-road device 300 installed on a road through road-vehicle communication 500 to transmit and receive information. In FIG. 1, reference numeral 600 indicates thick fog, and reference numeral 700 indicates rain.

Figure 2:
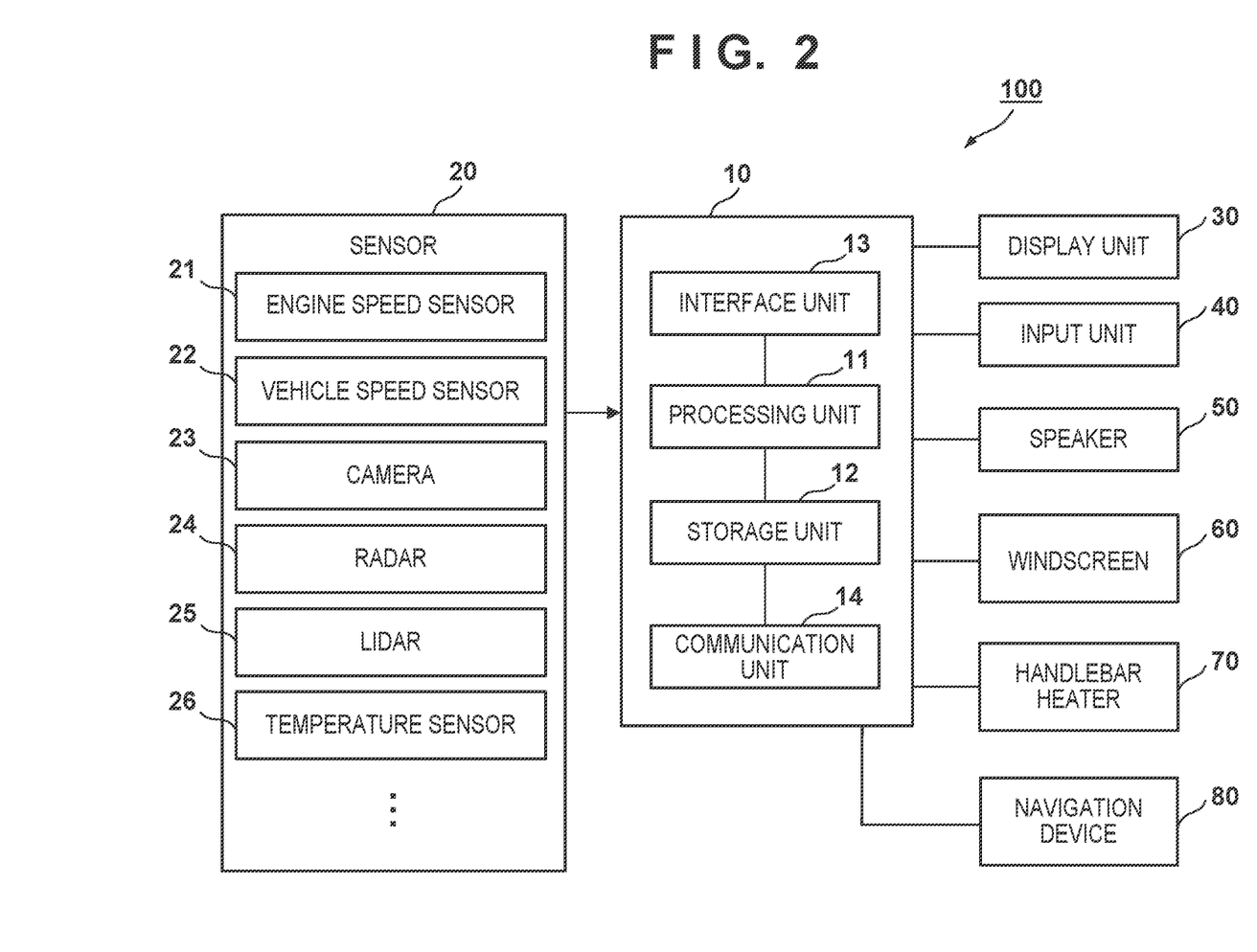
FIG. 2 is a block diagram of the straddle type vehicle (motorcycle) according to an embodiment of the present invention.

FIG. 2 is a block diagram of the motorcycle 100 according to an embodiment of the present invention. The motorcycle 100 includes a control device 10, various sensors 20, a display unit 30, an input unit 40, a speaker 50, a windscreen 60, a handlebar heater 70, and a navigation device 80. Note that the display unit 30, the input unit 40 and/or the speaker 50 may be included in the control device 10.

The control device 10 includes a processing unit 11 such as a CPU, a storage unit 12 such as a RAM and a ROM, an interface unit 13 for connecting an external device and the processing unit 11, and a communication unit 14. The processing unit 11 reads and executes a program stored in the storage unit 12, and thus performs a process according to the present embodiment. The interface unit 13 is connected with the display unit 30, the input unit 40, the speaker 50, and the like. The communication unit 14 is capable of communicating with another vehicle or an on-road device installed on a road through inter-vehicle communication or road-vehicle communication to transmit and receive information.

The various sensors 20 include an engine speed sensor 21, a vehicle speed sensor 22, a camera 23, a radar 24 and/or a light detection and ranging (LiDAR) 25, a temperature sensor 26, and the like. The engine speed sensor 21 is a sensor for detecting the engine speed of an engine 101. The vehicle speed sensor 22 is a sensor for detecting the vehicle speed of the motorcycle 100. The camera 23 is an imaging device using, for example, a CCD/CMOS image sensor. The radar 24 is, for example, a distance measuring device such as a millimeter wave radar. In addition, the LiDAR 25 is, for example, a distance measuring device such as a laser radar. These sensors are respectively disposed at positions to be capable of detecting surrounding information of the motorcycle 100, for example, on a front side, a rear side, an upper side, and/or a lateral side of the vehicle. The temperature sensor 26 is a sensor for measuring an outside air temperature.

The display unit 30 displays various types of information to present information to the driver. The input unit 40 is, for example, an operation element, and receives inputs of various types of information, based on an operation by the driver. The speaker 50 notifies, by sounds, various kinds of information that have been processed by the control device 10.

The windscreen 60 is a movable windscreen, and reduces the influence of the wind to be received by the driver of the motorcycle 100 during traveling. The windscreen 60 in the present embodiment is movable, and its height can be changed in accordance with the control by the control device 10 or in accordance with an operation by the driver. For example, when it rains, the height of the windscreen can be changed to a higher position to prevent the rain and wind.

The handlebar heater 70 is a heater for warming a handlebar part. By warming the handlebar in the season while the outside air temperature is low such as winter, comfortable traveling is enabled. For example, the temperature of the handlebar can be adjusted to be an appropriate temperature in accordance with the outside air temperature that has been measured by the temperature sensor 26.

The navigation device 80 is capable of receiving an input of information such as a departure location, a destination location, and a transit location, generating a scheduled travel route based on the information that has been received, and presenting the scheduled travel route to the driver.

<Process>

Figure 3:
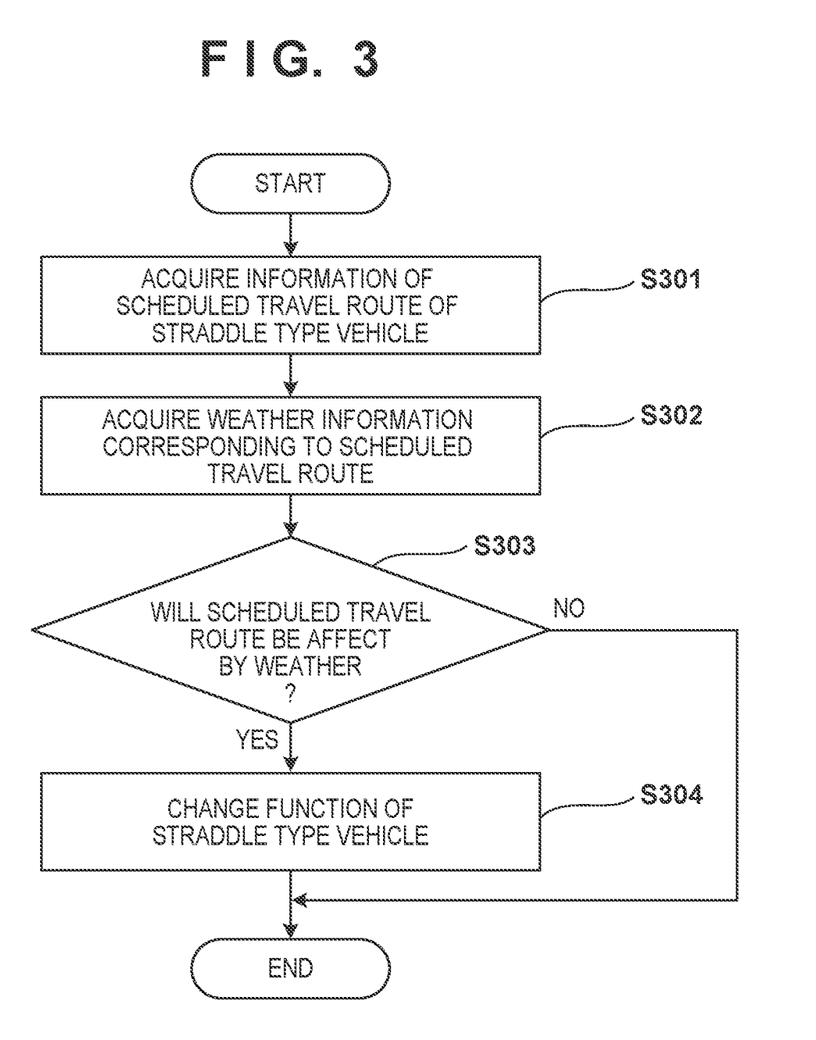
FIG. 3 is a flowchart illustrating a procedure of a process performed by a control device according to a first embodiment.

FIG. 3 is a flowchart illustrating a procedure of a process performed by the control device 10 according to the present embodiment. The present process is performed by the processing unit 11 of the control device 10 reading and executing a program stored in the storage unit 12.

[Step S301]

In step S301, the processing unit 11 acquires, via the communication unit 14, information of a scheduled travel route of the straddle type vehicle (motorcycle 100). For example, information of a route that has been generated by the navigation device 80 is acquired as the scheduled travel route.

[Step S302]

In step S302, the processing unit 11 acquires, via the communication unit 14, weather information corresponding to the scheduled travel route acquired in step S301. For example, the weather information may be acquired from, for example, a medium that distributes weather information (weather forecast or the like) through the Internet. Alternatively, when rain and the road being wet or dense fog is recognized by analyzing imaged information that has been imaged by a camera of a preceding vehicle (for example, the motorcycle 200 in FIG. 1), information of the rain or information of the dense fog may be received from the preceding vehicle through the inter-vehicle communication 400. Furthermore, weather information may be acquired by receiving weather information in the surroundings of the on-road device 300, which is present on the scheduled travel route, from the on-road device 300 through the road-vehicle communication 500.

[Step S303]

In step S303, the processing unit 11 determines whether the scheduled travel route is to be affected by the weather. Then, in a case where it is determined that the scheduled travel route is to be affected by the weather, the process proceeds to step S304. On the other hand, in a case where it is determined that the scheduled travel route is not to be affected by the weather, the process ends.

For example, on the scheduled travel route, for example, when the dense fog or the rain is observed or predicted at a current or future scheduled travel time, it can be determined that the scheduled travel route is to be affected by the weather. Regarding rain, when a predetermined precipitation amount (for example, X mm per hour) or more is measured or predicted, it can be determined that the scheduled travel route is to be affected by the weather. Regarding dense fog, when a dense fog warning is issued as the weather information, or when the preceding vehicle, the on-road device 300, or the like determines the dense fog and such information is received, it can be determined that the scheduled travel route is to be affected by the weather.

Note that in the present embodiment, the description will be given using dense fog or rain as an example. However, the case of being affected by the weather is not limited to these examples, and any other weather, for example, thunder of lightning, snow, hail, sleet, or the like may be used.

[Step S304]

In step S304, the processing unit 11 changes a function related to one or more traveling states of the straddle type vehicle (motorcycle 100).

For example, the change of the function includes a change of an output characteristic of the drive force with respect to an input characteristic of an operation input for operating the driving of the straddle type vehicle (motorcycle 100). In a case where it is determined that the scheduled travel route is to be affected by the weather, the output characteristic with respect to the input characteristic is changed to be less sensitive. Accordingly, slip or the like due to sudden acceleration can be prevented.

In addition, the change of the function includes a change of the gear ratio when the straddle type vehicle (motorcycle 100) starts traveling. In the case where it is determined that the scheduled travel route is to be affected by the weather, the first gear start is changed to the second gear start. At the first gear start of stronger torque, the straddle type vehicle easily slips. However, at the second gear start of weaker torque, the straddle type vehicle hardly slips. For this reason, in the case where the scheduled travel route is to be affected by the weather, the second gear is set at the start. Accordingly, slip or the like can be prevented.

In addition, the change of the function includes a change of the position of the movable windscreen 60 included in the straddle type vehicle (motorcycle 100). In the case where it is determined that the scheduled travel route is to be affected by the weather, the windscreen 60 is moved to a higher position. Accordingly, the driver can be protected from rain or the like.

The change of the function includes a change of the heater temperature of the handlebar heater 70 included in the straddle type vehicle (motorcycle 100). In the case where it is determined that the scheduled travel route is to be affected by the weather, the heater temperature is changed to be higher. Accordingly, for example, when the outside air temperature is low in winter or the like, in particular, the driver becomes sensitive to chill or coldness due to the influence of rain, and thus, it is possible to warm the driver's hands in such a situation. Therefore, more comfortable traveling is enabled. This concludes a series of process of FIG. 3.

As described above, in the present embodiment, the function related to the traveling state of the straddle type vehicle is controlled, based on a determination result as to whether the scheduled travel route is to be affected by the weather, based on the weather information on the scheduled travel route of the straddle type vehicle.

Accordingly, appropriate function control can be conducted in accordance with the weather on the scheduled travel route. Therefore, when affected by the weather, safer traveling is achievable.

Note that, in the present embodiment, the description has been given for the example of automatically changing the function. However, information (for example, an alert) indicating that the scheduled travel route is to be affected by the weather may be notified, and the function may be changed after the notification. Alternatively, a notification of declaring the change of the function may be given, and the function may be automatically changed after the notification.

Second Embodiment

In the first embodiment, the description has been given for an example in which the function of the straddle type vehicle is automatically controlled (changed), in the case where the scheduled travel route is to be affected by the weather. On the other hand, in the present embodiment, a description will be given for an example in which the function is not automatically changed, but guidance about confirming a change is given to the driver, and when permission is acquired, the function is changed. The device configuration and the like are similar to those in the first embodiment, and the descriptions will be omitted.

<Process>

Figure 4:
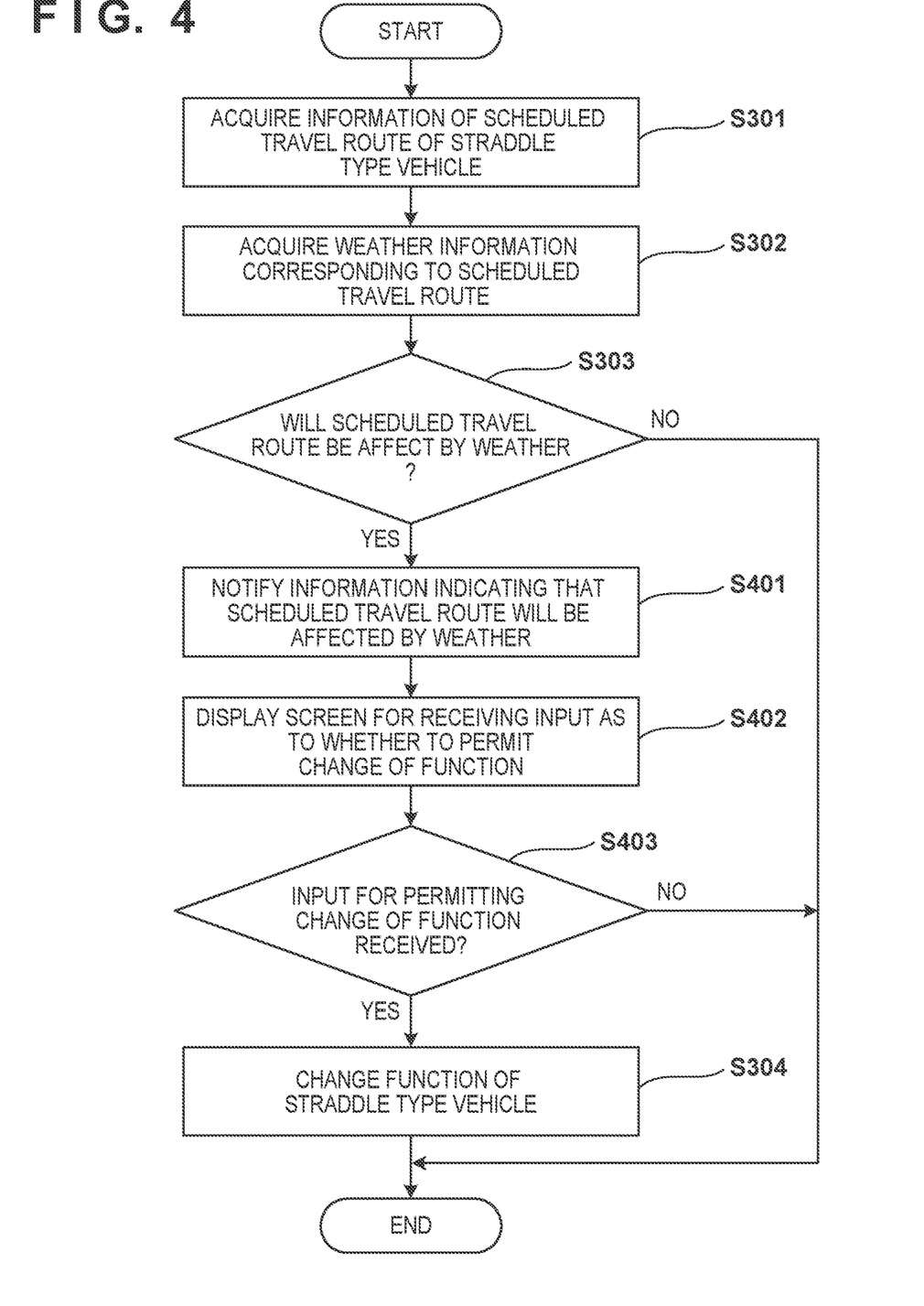
FIG. 4 is a flowchart illustrating a procedure of a process performed by the control device according to a second embodiment.

FIG. 4 is a flowchart illustrating a procedure of a process performed by the control device 10 according to the present embodiment. The present process is performed by the processing unit 11 of the control device 10 reading and executing a program stored in the storage unit 12. In addition, the same steps as those described in FIG. 3 are denoted by the same reference numerals, and the descriptions will be omitted.

[Step S401]

In step S401, the processing unit 11 notifies information (for example, an alert) indicating that the scheduled travel route is to be affected by the weather. As for the notification method, notification may be performed, for example, by displaying information on the display unit 30, or guidance may be provided by sounds through the speaker 50, or they may be combined.

[Step S402]

In step S402, the processing unit 11 displays, on the display unit 30, a screen for receiving an input as to whether to permit the change of the function.

[Step S403]

In step S403, the processing unit 11 determines whether an input for permitting the change of the function has been received. In a case where the input for permission is received, the process proceeds to step S304. On the other hand, in a case where the change of the function is rejected, the process ends. This concludes a series of processes of FIG. 4.

As described above, in the present embodiment, in the case where the scheduled travel route is to be affected by the weather, such a fact will be notified to the driver of the straddle type vehicle (motorcycle 100). Furthermore, an input as to whether to permit the change of the function is received. In the case where the input for permission is received, the function is changed.

Accordingly, the driver is able to recognize at an early stage that there is a possibility of bad weather on the scheduled travel route. Furthermore, the function is changed in response to the permission. Thus, it is possible to prevent the function from being automatically changed, also in a case where the driver considers that the change of the function is unnecessary.

Third Embodiment

In the present embodiment, a description will be given for an example of controlling the timing of changing the function in more detail. The device configuration and the like are similar to those in the first embodiment, and the descriptions will be omitted.

<Process>

Figure 5:
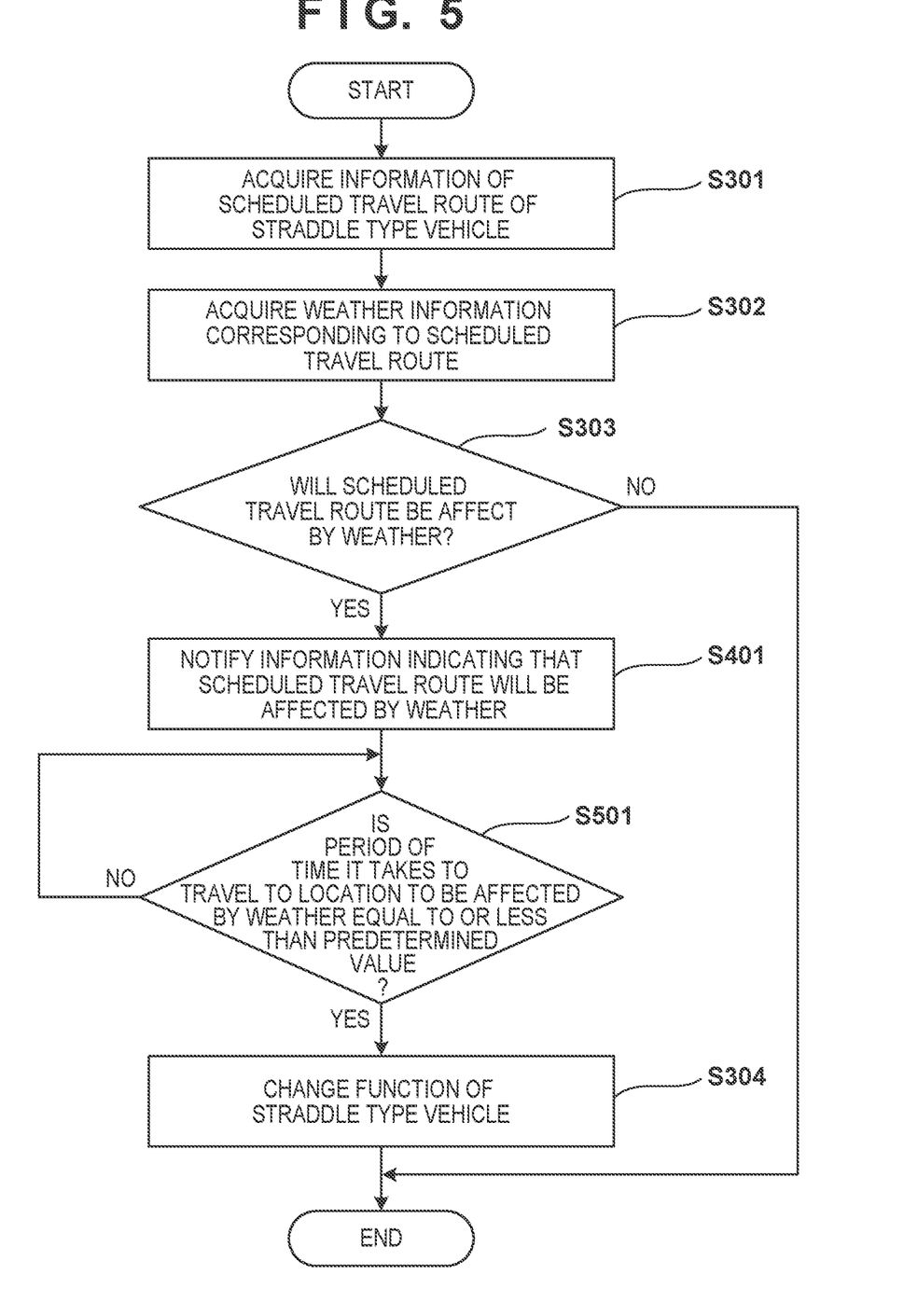
FIG. 5 is a flowchart illustrating a procedure of a process performed by the control device according to a third embodiment.

FIG. 5 is a flowchart illustrating a procedure of a process performed by the control device 10 according to the present embodiment. The present process is performed by the processing unit 11 of the control device 10 reading and executing a program stored in the storage unit 12. In addition, the same steps as those described in FIGS. 3 and 4 are denoted by the same reference numerals, and the descriptions will be omitted.

[Step S501]

In step S501, the processing unit 11 determines whether a period of time for arrival at the location to be affected by the weather is equal to or less than a predetermined value. The period of time for arrival here is, for example, a value obtained by dividing the distance from a current location to the location to be affected by the weather by a current speed. Alternatively, the period of time for arrival may be a predicted period of time, which has been calculated by the navigation device 80, from the current location to the location to be affected by the weather. In a case where it is determined that the period of time for arrival is equal to or less than the predetermined value, the process proceeds to step S304. On the other hand, in a case where it is determined that the period of time for arrival exceeds the predetermined value, the process waits until the period of time for arrival becomes the predetermined value. This concludes a series of processes of FIG. 5.

As described above, in the present embodiment, in the case where it is determined that the scheduled travel route is to be affected by the weather, when the period of time for arrival at the location to be affected by the weather becomes equal to or less than the predetermined value, the function of the straddle type vehicle (motorcycle 100) is changed.

Accordingly, the function can be changed at an appropriate timing without giving an uncomfortable feeling to the driver, because too early function change is prevented.

[Modifications]

In each of the above-described embodiments, the descriptions have been given for the example in which the change of the function of the straddle type vehicle (motorcycle 100) is made, in the case where the scheduled travel route is to be affected by the weather. However, the change of the function does not have to be made in a uniform manner.

For example, the degree of a change of the function may be adjusted in accordance with the degree to be affected by the weather. For example, in a case where the change of the function is a change of the output characteristic of the drive force with respect to the input characteristic of the operation input for operating the driving of the straddle type vehicle, the output characteristic with respect to the input characteristic may be changed to be less sensitive as the rainfall amount is increases or the dense fog becomes thicker. In addition, in a case where the change of the function is a change of the position of the movable windscreen 60 provided in the straddle type vehicle, the windscreen 60 may be moved to a higher position, as the rainfall amount increases. Further, in a case where the change of the function is a change of the heater temperature of the handlebar heater 70 provided in the straddle type vehicle, the heater temperature may be controlled to be higher, as the rainfall amount increases.

Further, in a case where the change of the function is a change of the heater temperature of the handlebar heater 70 provided in the straddle type vehicle, the degree of the change of the heater temperature may be adjusted, based on the outside air temperature that has been detected by the temperature sensor 26. For example, the heater temperature may be adjusted to be higher, as the outside air temperature decreases.

In addition, the straddle type vehicle (motorcycle 100) does not always travel along the scheduled travel route. For example, after the change of the function, when the straddle type vehicle changes its course to a route that is not to be affected by the weather, the change of the function may be canceled. Accordingly, it is possible to prevent the changed state from being maintained, in spite of the fact that the change of the function has become unnecessary.

In addition, the function change may be canceled as necessary, even in a case where the vehicle travels along the scheduled travel route without making a course change. For example, after the change of the function, when the straddle type vehicle travels on the scheduled travel route and passes through a range affected by the weather in the scheduled travel route, the change of the function may be automatically canceled. In such a case, the driver may be further notified that the change of the function has been canceled and the function has returned to normal.

In addition, in each of the above embodiments, the motorcycle 100 has been described as an example. However, the present invention is not limited to the motorcycle. For example, the present invention is also applicable to any other vehicle such as a four-wheeled vehicle.

Other Embodiments

In addition, a program for achieving one or more functions that have been described in each of the embodiments is supplied to a system or apparatus through a network or a storage medium, and one or more processors in a computer of such a system or apparatus are capable of reading and executing the program. The present invention is also achievable by such an aspect.

The invention is not limited to the foregoing embodiments, and various variations/changes are possible within the spirit of the invention.

Summary of Embodiments

A control device according to a first aspect is
a control device (for example, 10) that controls a straddle type vehicle (for example, 100), the control device including:
route information acquisition means (for example, 11) for acquiring information of a scheduled travel route of the straddle type vehicle;
weather information acquisition means (for example, 11) for acquiring weather information corresponding to the scheduled travel route;
determination means (for example, 11) for determining whether the scheduled travel route of the straddle type vehicle is to be affected by weather based on the weather information; and
control means (for example, 11) for controlling a function related to a traveling state of the straddle type vehicle, based on a determination result of the determination means.

Accordingly, appropriate function control can be conducted in accordance with the weather on the scheduled travel route.

In the control device according to a second aspect,
in a case where the weather on the scheduled travel route is predetermined weather, the determination means determines that the scheduled travel route is to be affected by the weather, and
in a case where it is determined that the scheduled travel route is to be affected by the weather, the control means changes the function of the straddle type vehicle.

Accordingly, when affected by the weather, safer traveling is achievable.

In the control device according to a third aspect,
the predetermined weather is either rain or dense fog.

Accordingly, when the weather is either rain or dense fog, safer traveling is achievable.

In the control device according to a fourth aspect,
in a case where it is determined that the scheduled travel route is to be affected by the weather and a period of time for the straddle type vehicle to arrive at a location on the route to be affected by the weather is equal to or smaller than a predetermined value, the control means changes the function of the straddle type vehicle.

Accordingly, when the straddle type vehicle approaches the location to be affected by the weather, the function can be changed in advance before arriving at the location.

In the control device according to a fifth aspect, the control means adjusts a degree of a change of the function in accordance with a degree to be affected by the weather.

Accordingly, the function change in more detail is enabled in accordance with the degree to be affected by the weather.

In the control device according to a sixth aspect,
a change of the function includes a change of an output characteristic of drive force with respect to an input characteristic of an operation input for operating driving of the straddle type vehicle, and
in a case where it is determined that the scheduled travel route is to be affected by the weather, the control means changes the output characteristic with respect to the input characteristic to be less sensitive.

Accordingly, slip or the like due to sudden acceleration can be prevented.

In the control device according to a seventh aspect,
the change of the function includes a change of a gear ratio when the straddle type vehicle starts traveling, and
in a case where it is determined that the scheduled travel route is to be affected by the weather, the control means changes from a first gear start to a second gear start.

Accordingly, slip or the like can be prevented by setting to the second gear start of weaker torque.

In the control device according to an eighth aspect,
the change of the function includes a change of a position of a movable windscreen (for example, 60) included in the straddle type vehicle, and
in a case where it is determined that the scheduled travel route is to be affected by the weather, the control means moves the windscreen to a higher position.

Accordingly, the driver can be protected from rain or the like.

In the control device according to a ninth aspect,
the change of the function includes a change of a heater temperature of a handlebar heater (for example, 70) included in the straddle type vehicle, and
in a case where it is determined that the scheduled travel route is to be affected by the weather, the control means changes the heater temperature to be higher.

Accordingly, for example, when the outside air temperature is low in winter or the like, in particular, it becomes sensitive to chill or coldness due to the influence of rain, and thus, it is possible to warm the driver's hands in such a situation. Therefore, more comfortable traveling is enabled.

In the control device according to a tenth aspect,
the control means adjusts a degree of a change of the heater temperature, based on an outside air temperature detected by a temperature sensor included in the straddle type vehicle.

Accordingly, for example, it becomes possible to prevent the heater temperature from being too high, when the outside air temperature is high, and it becomes possible to appropriately warm the driver's hands by increasing the heater temperature, when the outside air temperature is low.

In the control device according to an eleventh aspect,
in a case where it is determined that the scheduled travel route is to be affected by the weather, the control means adjusts the degree such that the heater temperature becomes higher, as the outside air temperature decreases.

Accordingly, it becomes possible to warm the driver's hands appropriately.

In the control device according to a twelfth aspect,
after the change of the function, when the straddle type vehicle changes a course to a route that is not to be affected by the weather, the control means cancels the change of the function.

Accordingly, the function change can be prevented, even when the function change becomes unnecessary.

The control device according to a thirteenth aspect
further includes notification means (for example, 11, 30, 50) for notifying information indicating that the scheduled travel route is to be affected by the weather, in a case where it is determined that the scheduled travel route is to be affected by the weather.

Accordingly, the driver is able to easily recognize a situation in the future.

In the control device according to a fourteenth aspect,
after the notification means notifies, the control means changes the function.

Accordingly, the driver is able to change the function after recognizing the situation in the future, and thus it is possible to reduce an uncomfortable feeling of the driver for the function change.

The control device according to a fifteenth aspect,
further includes display control means (for example, 11) for causing a display unit (for example, 30) to display a screen for receiving an input for whether to permit a change of the function, in a case where it is determined that the scheduled travel route is to be affected by the weather, in which
when the input for permitting the change of the function is received, the function is changed.

Accordingly, it is possible to prevent the function change from being automatically made, even when the driver does not desire the function change. Therefore, the control further in accordance with a driver's intention is enabled.

In the control device according to a sixteenth aspect,
after the change of the function, when the straddle type vehicle travels on the scheduled travel route and passes through a range affected by the weather in the scheduled travel route, the control means cancels the change of the function.

Accordingly, it is possible to eliminate the labor of the driver to cancel the function change by himself/herself, when the function change becomes unnecessary, and thus more comfortable traveling is enabled.

A straddle type vehicle according to a seventeenth aspect is
a straddle type vehicle including the control device according to any of the first to sixteenth aspects.

Accordingly, the straddle type vehicle is capable of performing the process of the control device.

An operation method of a control device according to an eighteenth aspect is
an operation method of a control device (for example, 10) that controls a straddle type vehicle (for example, 100), the operation method comprising:
a route information acquisition step of acquiring information of a scheduled travel route of the straddle type vehicle (for example, S301);
a weather information acquisition step of acquiring weather information corresponding to the scheduled travel route (for example, S302);
a determination step of determining whether the scheduled travel route of the straddle type vehicle is to be affected by weather based on the weather information (for example, S303); and
a control step of controlling a function related to a traveling state of the straddle type vehicle, based on a determination result of the determination step (for example, S304).

Accordingly, appropriate function control can be conducted in accordance with the weather on the scheduled travel route.

A program according to a nineteenth aspect is
a program for causing a computer to function as the control device according to any of the first to sixteenth aspects.

Accordingly, the process of the control device is achievable by a computer.

According to the present invention, when affected by the weather, safer traveling is achievable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control device that controls a straddle type vehicle, the control device comprising:
   a route information acquisition unit configured to acquire information of a scheduled travel route of the straddle type vehicle;
   a weather information acquisition unit configured to acquire weather information corresponding to the scheduled travel route;
   a determination unit configured to determine whether the scheduled travel route of the straddle type vehicle is to be affected by weather based on the weather information; and
   a control unit configured to control a function related to a traveling state of the straddle type vehicle, based on a determination result of the determination unit,
   wherein the control unit adjusts a degree of a change of the function in accordance with a degree to be affected by the weather.

2. The control device according to claim 1, wherein
   in a case where the weather on the scheduled travel route is predetermined weather, the determination unit determines that the scheduled travel route is to be affected by the weather, and
   in a case where it is determined that the scheduled travel route is to be affected by the weather, the control unit changes the function of the straddle type vehicle.

3. The control device according to claim 2, wherein the predetermined weather is either rain or dense fog.

4. The control device according to claim 1, wherein in a case where it is determined that the scheduled travel route is to be affected by the weather and a period of time for the straddle type vehicle to arrive at a location on the route to be affected by the weather is equal to or smaller than a predetermined value, the control unit changes the function of the straddle type vehicle.

5. The control device according to claim 1, wherein a change of the function includes a change of an output characteristic of drive force with respect to an input characteristic of an operation input for operating driving of the straddle type vehicle, and
   in a case where it is determined that the scheduled travel route is to be affected by the weather, the control unit changes the output characteristic with respect to the input characteristic to be less sensitive.

6. The control device according to claim 1, wherein a change of the function includes a change of a gear ratio when the straddle type vehicle starts traveling, and
   in a case where it is determined that the scheduled travel route is to be affected by the weather, the control unit changes from a first gear start to a second gear start.

7. The control device according to claim 1, wherein a change of the function includes a change of a position of a movable windscreen included in the straddle type vehicle, and
   in a case where it is determined that the scheduled travel route is to be affected by the weather, the control unit moves the windscreen to a higher position.

8. The control device according to claim 1, wherein a change of the function includes a change of a heater temperature of a handlebar heater included in the straddle type vehicle, and
   in a case where it is determined that the scheduled travel route is to be affected by the weather, the control unit changes the heater temperature to be higher.

9. The control device according to claim 8, wherein the control unit adjusts a degree of a change of the heater temperature, based on an outside air temperature detected by a temperature sensor included in the straddle type vehicle.

10. The control device according to claim 9, wherein in a case where it is determined that the scheduled travel route is to be affected by the weather, the control unit adjusts the degree such that the heater temperature becomes higher, as the outside air temperature decreases.

11. The control device according to claim 1, wherein after a change of the function, when the straddle type vehicle changes a course to a route that is not to be affected by the weather, the control unit cancels the change of the function.

12. The control device according to claim 1, further comprising a notification unit configured to notify information indicating that the scheduled travel route is to be affected by the weather, in a case where it is determined that the scheduled travel route is to be affected by the weather.

13. The control device according to claim 12, wherein after the notification unit notifies, the control unit changes the function.

14. The control device according to claim 12, further comprising a display control unit configured to cause a display unit to display a screen for receiving an input for whether to permit a change of the function, in a case where it is determined that the scheduled travel route is to be affected by the weather, wherein
   when the input for permitting the change of the function is received, the function is changed.

15. The control device according to claim 1, wherein after a change of the function, when the straddle type vehicle travels on the scheduled travel route and passes through a range affected by the weather in the scheduled travel route, the control unit cancels the change of the function.

16. A straddle type vehicle comprising the control device according to claim 1.

17. An operation method of a control device that controls a straddle type vehicle, the operation method comprising:
   acquiring information of a scheduled travel route of the straddle type vehicle;
   acquiring weather information corresponding to the scheduled travel route;
   determining whether the scheduled travel route of the straddle type vehicle is to be affected by weather based on the weather information; and
   controlling a function related to a traveling state of the straddle type vehicle, based on a determination result in the determining,
   wherein a degree of a change of the function is adjusted in accordance with a degree to be affected by the weather.

18. A computer readable storage medium storing a computer program for causing a computer to execute an operation method of a control device that controls a straddle type vehicle, the operation method comprising:
   acquiring information of a scheduled travel route of the straddle type vehicle;
   acquiring weather information corresponding to the scheduled travel route;

determining whether the scheduled travel route of the straddle type vehicle is to be affected by weather based on the weather information; and controlling a function related to a traveling state of the straddle type vehicle, based on a determination result in the determining, wherein a degree of a change of the function is adjusted in accordance with a degree to be affected by the weather.

* * * * *